H. J. HEIDER.
TRANSMISSION MECHANISM.
APPLICATION FILED MAY 9, 1914.
1,154,767.
Patented Sept. 28, 1915.
3 SHEETS—SHEET 3.
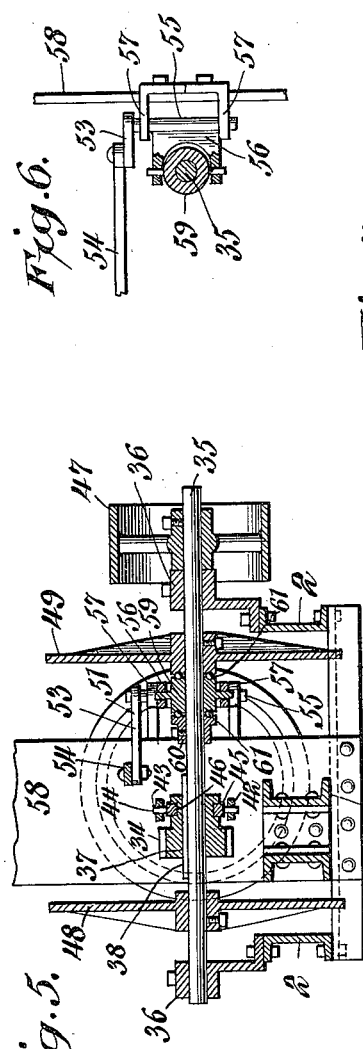
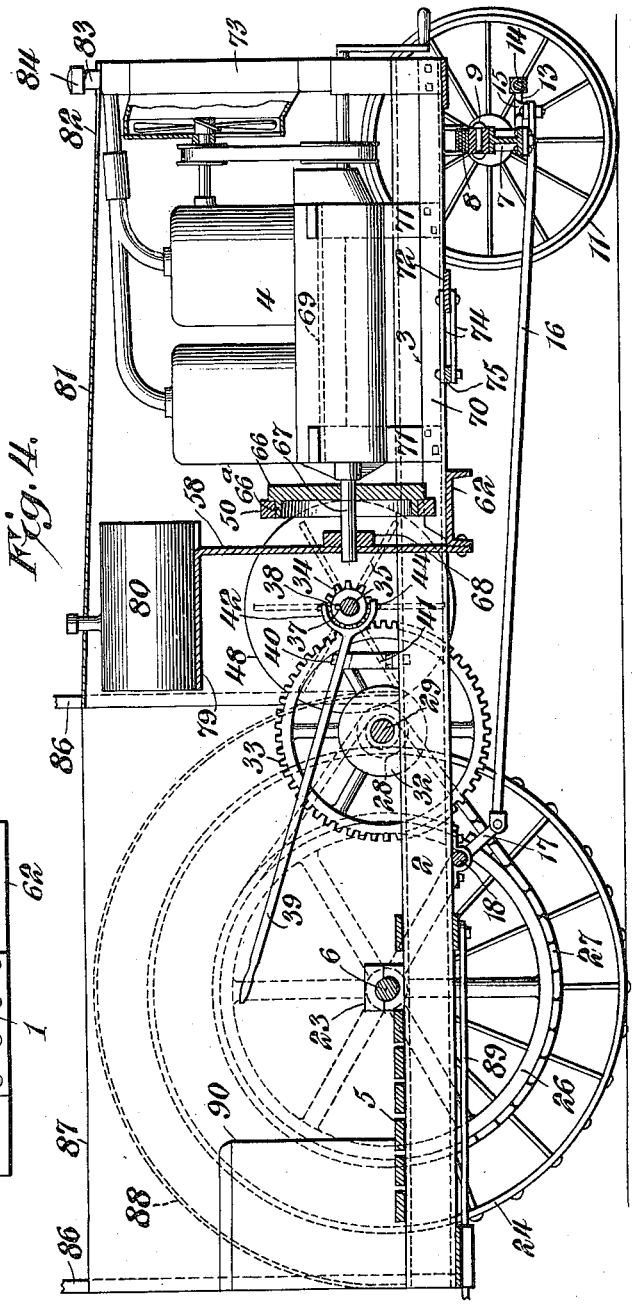
Henry J. Heider, INVENTOR,
WITNESSES
BY
ATTORNEY

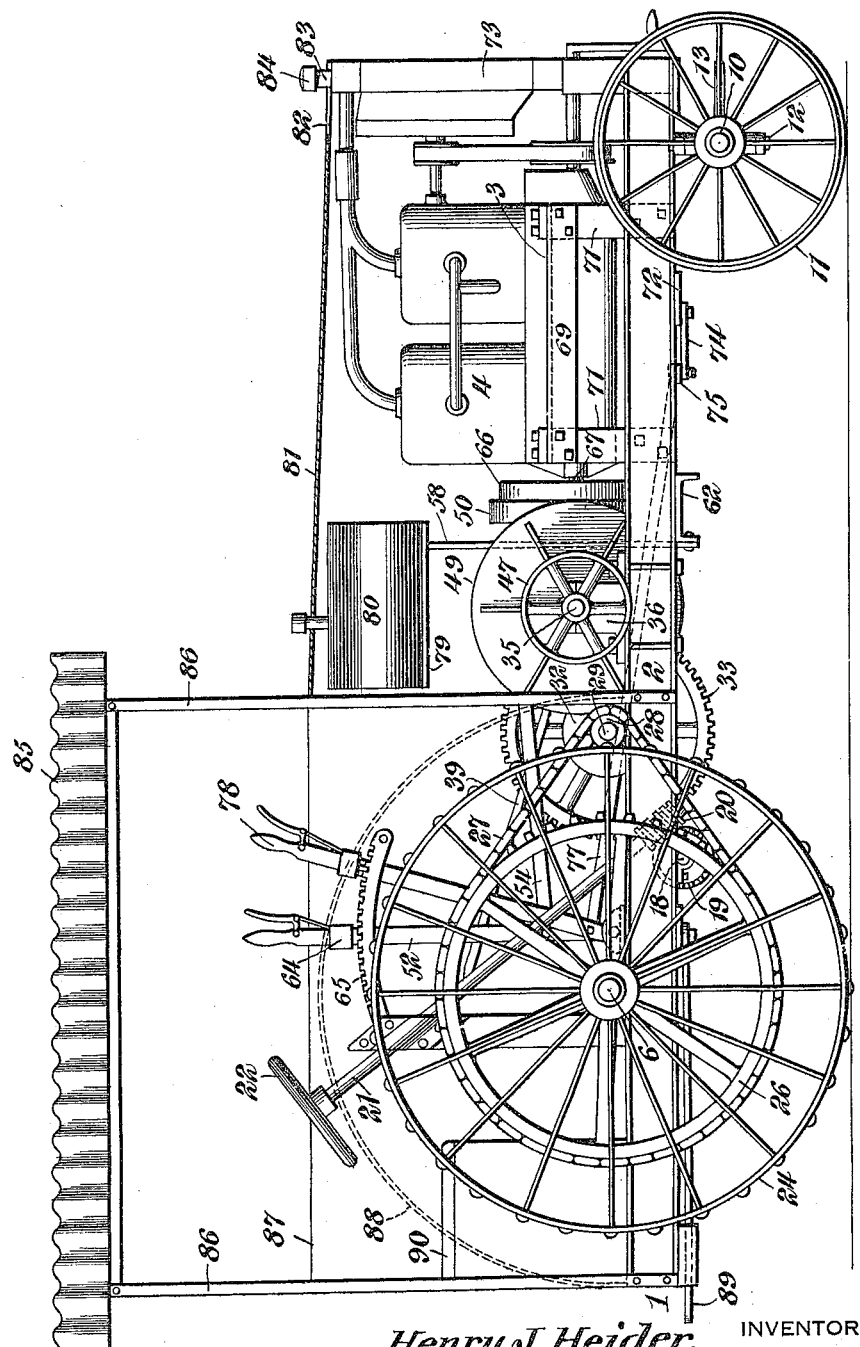

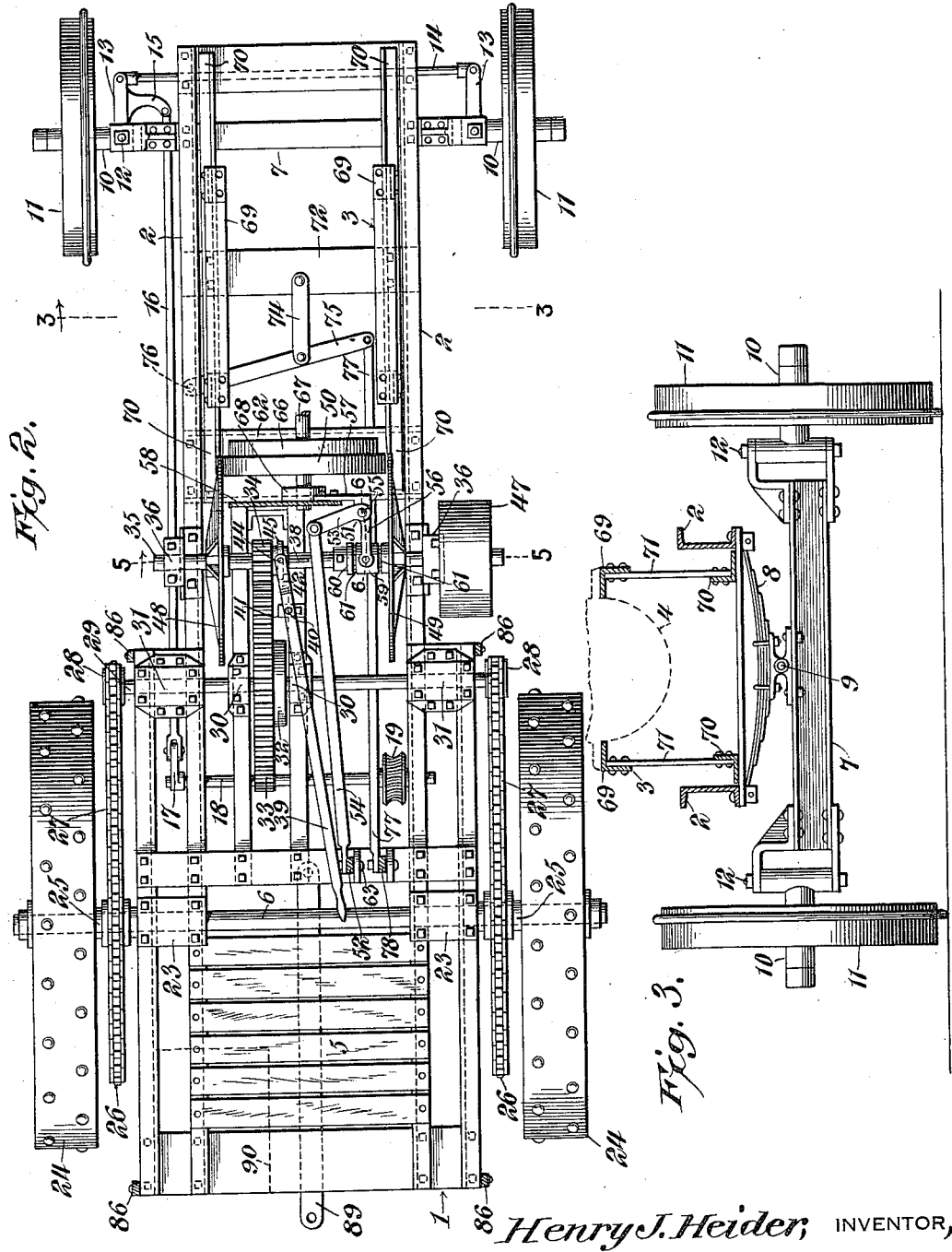

UNITED STATES PATENT OFFICE.

HENRY J. HEIDER, OF CARROLL, IOWA, ASSIGNOR TO HEIDER MFG. CO., OF CARROLL, IOWA.

TRANSMISSION MECHANISM.

1,154,767. Specification of Letters Patent. Patented Sept. 28, 1915.

Application filed May 9, 1914. Serial No. 837,440.

*To all whom it may concern:*

Be it known that I, HENRY J. HEIDER, a citizen of the United States, residing at Carroll, in the county of Carroll and State of Iowa, have invented a new and useful Transmission Mechanism, of which the following is a specification.

The invention relates to improvements in transmission mechanism for traction engines.

The object of the present invention is to improve the construction of transmission mechanism and to provide simple, practical, and efficient mechanism designed for traction engines for operating agricultural machinery and for moving plows and for various traction purposes, and equipped with a motor carrying a gear element arranged to directly engage friction disks, and adapted, through the adjustment of the motor, to vary the speed of the transmission gearing, whereby a plurality of different speeds may be obtained from a gasolene engine or other motor traveling at a single speed.

Another object of the invention is to provide a transmission gearing arranged to coöperate with the gear element of the movable motor, so as to start or reverse the traction engine without disturbing the motor after the same has been adjusted to rotate the transmission gearing at a predetermined speed, and also for disconnecting the transmission gearing from the traction wheels of the engine to permit power to be taken from a driving pulley for operating various machinery while the traction engine is stationary.

A further object of the invention is to provide a movably mounted motor of this character, adapted, through its movement, to afford ready access both to the parts of the engine and the said motor actuated gear element to enable the same to be readily repaired or renewed, and at the same time, to facilitate the ready removal of the motor from the main frame of the traction engine without disturbing the latter or the connections between the motor and the radiator or other parts of the mechanism.

With these and other objects in view the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawings:—Figure 1 is a side elevation of a traction engine constructed in accordance with this invention. Fig. 2 is a plan view of the same, parts being removed and other parts being in section. Fig. 3 is a transverse sectional view on the line 3—3 of Fig. 2. Fig. 4 is a central longitudinal sectional view. Fig. 5 is a transverse sectional view on the line 5—5 of Fig. 2. Fig. 6 is a detail vertical sectional view on the line 6—6 of Fig. 2.

Like numerals of reference designate corresponding parts in all the figures of the drawings.

In the accompanying drawings, in which is illustrated the preferred embodiment of the invention, 1 designates a horizontal main frame provided at opposite sides with channel beams 2 connected by suitable cross bars and arranged in parallelism and forming a guide or way at the front portion of the main frame for a longitudinally slidable subframe 3, upon which is mounted a motor 4. The main frame is preferably provided with a widened rear portion formed by rear longitudinally disposed channel beams located beyond and spaced from the main longitudinal side beams 2 and suitably connected with the same. The main frame, which may be constructed in any other preferred manner, is provided at its rear portion with a platform 5 for the accommodation of the operator. The platform preferably consists of spaced transversely disposed slats extending across the space between the main longitudinal beams 2 and having their terminal portions arranged upon and secured to the same.

The main frame is supported at the back by a rear axle 6, and at its front portion by a front axle 7, a semi-elliptic leaf spring 8 being preferably interposed between the front portion of the main frame and the front axle. The spring 8, which is transversely disposed, is suitably secured at its ends of the main frame at opposite sides thereof and it has a central pivotal connection 9 with the front axle 7. The front axle is provided with spindles 10 receiving front guiding wheels 11 and mounted to turn on vertical pivots 12. The spindles 10, which are connected with the front axle 7 by suitable knuckle joints, are provided with forwardly extending arms 13, which are connected in the usual manner by a transverse rod 14 for causing the spindles to turn in unison in guiding the traction engine. One of the forwardly extending arms 13 carries a transversely disposed arm 15 extending inwardly from such forwardly extending arm 13 and connected by a longitudinal rod 16 with a rocker arm 17 of a transverse rock shaft 18. The rock shaft 18, which is journaled in suitable bearings of the main frame at the rear portion thereof, has keyed or otherwise secured to it a worm wheel 19, which meshes with a worm 20 of an inclined steering shaft 21. The worm gearing and the inclined steering shaft are preferably located at the right hand side of the traction engine, as shown, and the said inclined steering shaft is equipped at its upper end with a suitable steering wheel 22. When the steering wheel is turned, the transverse rock shaft 18 is partially rotated, thereby moving the rocker arm 17 backwardly or forwardly and imparting a horizontal swinging movement to the spindles of the front axle. Any other suitable steering mechanism may, however, be employed.

The rear axle, which is rigidly secured to the main frame, is mounted in suitable bearings 23, and its spindles receive driving or traction wheels 24 adapted to rotate on the rear axle. The traction wheels, which may be of any preferred construction, are provided with extended hubs 25, projecting from the inner sides of the tractors or traction wheels 24, and having mounted on them large sprocket gears 26, which are connected by sprocket chains 27 with sprocket pinions 28, mounted on the ends of a divided transversely disposed shaft 29. The chain is preferably a roller sprocket chain, but any other form of chain or gearing may be employed for transmitting motion from the divided transverse shaft 29 to the traction wheels. The transverse shaft 29 is journaled in intermediate and side bearings 30 and 31 and its sections are connected in the usual manner by differential gearing (not shown) preferably incased in an enlarged hub 32 of a spur gear wheel 33, which meshes with a shiftable pinion 34 of a transversely disposed transmission shaft 35. The transmission shaft 35 is journaled in suitable bearings 36 of the main frame, and the pinion 34 is provided with a groove 37, which receives a feather or key 38 of the transmission shaft 35, whereby the pinion is slidably interlocked with the said shaft 35 and is adapted to be moved longitudinally of the same into and out of mesh with the large spur gear wheel 33. The pinion 34 is moved along the shaft 35 by a shifting lever 39, disposed longitudinally of the main frame and fulcrumed at a point intermediate of its ends at 40 on a vertical pivot of a support 41. The support 41, which may be of any preferred construction, is suitably mounted on the main frame and the shifting lever 39, which extends rearwardly from the transmission shaft to a point within easy reach of the operator, has a forked front portion 42 provided with perforations 43 for the reception of projecting pivots 44 of a ring 45 mounted in a groove 46 in an extended portion of the hub of the spur pinion 34. The shifting lever is adapted to be oscillated to slide the pinion 34 into and out of mesh with the gear wheel 33. This will enable power to be taken from a driving pulley 47, suitably fixed to the right hand end of the transmission shaft and adapted to receive a suitable belt to enable the traction engine, when stationary, to be employed for different belt work. Any other suitable form of gearing, however, may be employed for this purpose.

The transmission shaft 35 is also shiftable longitudinally in its bearings 36 to carry either one of a pair of friction disks or wheels 48 and 49 into engagement with a motor actuated gear element 50 and also to arrange the said friction disks or wheels 48 and 49 out of contact with the gear element 50. This will enable either the traction engine or the driving pulley 47, when the pinion 34 is moved out of mesh with the gear wheel 33, to be started, stopped, and rotated in either direction. The friction disks or wheels are located at opposite sides of the main frame, and have flat inner engaging or friction faces, and the transmission shaft is moved longitudinally in either direction by shifting mechanism comprising a bell crank lever 51, and an operating lever 52 connected with an arm 53 of the bell crank lever 51 by a rod 54. The arm 53 extends horizontally from the upper end of a spindle or pivot 55, which is provided at a point intermediate of its ends with a forked or bifurcated arm 56. The spindle or pivot portion 55 is journaled in spaced bearings 57 of a transverse supporting plate or member 58, and the arm 56 straddles a sleeve 59, which is interposed between the hub of the friction wheel 49, and a thrust collar 60. The sleeve 59 is arranged at the inner side of the friction disk or wheel 49 and the thrust collar is fixed to the shaft 35 by a set screw or other suitable means in spaced relation with the said friction disk or wheel 49. Antifriction balls 61 are arranged at each end of the sleeve 59, the hub of the friction disk or wheel 49 and the thrust collar 60 being provided with co-acting grooves forming races for the antifriction balls. Any other suitable antifriction thrust bearing may, of course, be provided. The supporting plate or member 58 is suitably secured to a transverse connecting beam 62 and the bearings for the vertical spindle or pivot portions 55 are located at the rear face of the said supporting plate or member 58. The arm 56 extends rearwardly from the spindle in a direction longitudinally of the traction engine, and the other arm 53 of the bell crank lever is disposed transversely of the main frame and extends inwardly from the pivot or spindle 55. The operating lever 52, which is fulcrumed at its lower end 63, is suitably mounted on the main frame and the connecting rod 54 is pivoted to the lever 52 at the lower portion thereof. The said lever 52 carries a spring actuated dog or detent 64, arranged to engage a curved rack 65 and controlled by a suitable latch lever mounted on the operating lever 52 adjacent to the handle or gripping portion thereof. When the operating lever 52 is swung forwardly or backwardly, the arm 56 is swung inwardly or outwardly, and the transmission shaft 35 is moved in a corresponding direction. The dog or detent of the curved rack enables the operating lever 52 to be secured in any of its adjustments.

The motor actuated gear element 50 consists of a rim of fiber or other suitable material mounted on an annular flange 66ª of a fly wheel or driving wheel 66 of the motor 4. The driving wheel or fly wheel is disposed transversely of the machine, while the friction disks or wheels are arranged longitudinally with respect to the frame of the machine. The motor shaft 67, which carries the driving wheel or fly wheel 66, is extended rearwardly and is slidably journaled in a bearing 68 of the transverse supporting plate or member 58, and it is adapted to be withdrawn from such bearing by the vertical movement of the motor to afford ready access to the fiber rim for enabling the same to be readily repaired or renewed. The motor, which preferably consists of a four cylinder gasolene engine, may be of any other preferred type, and the subframe 3, which supports and carries the motor, comprises in its construction upper and lower longitudinal angle bars 69 and 70 and connecting posts 71. The vertical posts or standards of the subframe are bolted or otherwise secured to vertical flanges of the angle bars 69 and 70, and the upper angle bars 69 have inwardly extending horizontal flanges upon which the motor is mounted. The lower angle bars have outwardly extending flanges which are arranged adjacent to the front guiding portions of the longitudinal beams 2 of the main frame. The lower longitudinally disposed angle bars 70 extend in advance and in rear of the upper angle bars 69 and they are supported upon suitable transverse connecting bars or members of the main frame. The supplemental frame is also provided with a transverse plate or member 72 extending across the frame of the traction engine and detachably bolted to the lower face of the horizontal flanges of the bars 70 and projecting beyond the same to engage beneath the longitudinal guiding portions of the side beams 2 of the main frame to prevent the lifting of the supplemental frame and the motor. The radiator 73 of the motor is supported by the projecting front portions of the lower bars of the subframe, and the motor, which is adapted to be moved backwardly and forwardly on the main frame without affecting the connections between the radiator and the motor or any other of the parts of the motor mechanism.

The transverse plate or member 72 of the subframe is connected by a pair of longiudinally disposed links 74 with a transversely disposed lever 75 fulcrumed at one end 76 on the main frame and connected at its other end by a rod 77 with an operating lever 78. The links 74 are centrally arranged and are pivoted at their front ends to the upper and lower faces of the transverse plate or member 72 centrally thereof, and the rear ends of the links are pivoted to the upper and lower faces of the lever 75 at a point intermediate of the ends thereof. The operating lever 78 is adapted to be swung backwardly and forwardly to slide the subframe and the motor toward and from the transmission shaft. By the said adjustment of the motor the speed of the friction disks or wheels, which comprise, with the gear element 50, the transmission gearing, may be varied, while the engine is operating at a single speed. As the motor actuated gear element is moved rearwardly toward the center of either of the friction disks or wheels, the speed of the same is increased, and an adjustment of the motor actuated gear toward the periphery of the friction disk or wheel will effect a corresponding reduction in the speed of the transmission gearing. In practice, the adjustment of the motor is made while the friction disks or wheels are out of contact with the motor actuated gear and after the motor has been properly adjusted, the friction disks may be moved into frictional engagement with the motor actuated gear. When it is desired to slide the subframe and the engine forwardly to afford access to the fiber rim or gear element 50, one of the bolts of the operating mechanism is disconnected to release the subframe from the control of the operating lever and when it is desired to entirely remove the subframe and the engine from the main frame, the transverse plate or member 72, which is engaged beneath the side beams 2 of the main frame, is unbolted. This will free the subframe and the engine can be removed from the main frame without affecting any of its parts.

The transverse plate or member 58 is provided at the top with a curved shelf or rest 79 for the reception of a gasoline tank 80 and the traction engine is equipped at its front portion with a hood 81 having a slot 82 at its front portion to enable it to clear the projecting neck or portion 83 to which the radiator cap 84 is secured. The hood 81 is open at its front end and the radiator of the motor constitutes a closure for the open front end of the hood. The machine is also equipped with a suitable top 85 supported by front and rear standards 86 arranged in pairs and forming convenient means for securing side walls 87 to the machine for forming a cab. In practice, the traction engine will also be provided with suitable wheel guards 88, as illustrated in dotted lines in Figs. 1 and 4 of the drawings, and a draw bar 89, which is located beneath the platform, and which extends in rear of the main frame, is pivotally connected at its front end to the same. Also, the traction engine is designed to be provided with a suitable seat 90 for the accommodation of the operator.

What is claimed is:—

1. The combination with a frame, of a motor movably mounted thereon, driving means actuated by the motor, driven elements adapted to be engaged by said driving means, means for moving the motor for governing the relation between said driving means and driven elements to regulate the speed of said means, and elements for operating the driven means for controlling the engagement between said driven elements and driving means.

2. A machine of the class described including a main frame, a motor slidable longitudinally of the main frame and carrying and actuating a gear element, a transverse shaft, spaced gear elements fixed to the transverse shaft and located at opposite sides of the motor actuated gear element, means for moving the motor for adjusting the gear element thereof radially with respect to the spaced gear elements, and shifting mechanism for moving the transverse shaft lengthwise to carry the said spaced gear elements into and out of engagement with the motor actuated gear element.

3. A machine of the class described including a main frame having a longitudinal guide or way, a subframe mounted upon and slidable along the guide or way, a motor mounted on the subframe and provided at the back with a gear element, a coacting gear element, and operating mechanism for moving the subframe and the motor for adjusting the motor actuated gear element radially with respect to the coacting gear element, said operating mechanism comprising a transverse lever fulcrumed on the main frame, means for connecting the transverse lever with the subframe, and an operating lever connected with the transverse lever.

4. A machine of the class described including a main frame having a longitudinal guide or way, a subframe slidable along the guide or way, a motor mounted on the subframe and carrying and actuating a gear element, a coacting gear element, and operating mechanism for moving the subframe and the motor for adjusting the motor actuated gear element radially with respect to the coacting gear element, said operating mechanism being provided with means for disconnecting the subframe from it to permit the subframe and the motor to be removed from the main frame.

5. A machine of the class described including a main frame provided at its front portion with a longitudinal guide or way, a subframe slidable along the guide or way, a motor mounted on the subframe and carrying at the back and actuating a gear element, said gear element being disposed transversely of the machine, a transverse shaft mounted on the main frame in rear of the subframe, spaced gear elements journaled on the transverse shaft at opposite sides of the motor actuated gear element, and operating mechanism connected with the subframe for sliding the same.

6. A machine of the class described including a main frame provided at its front portion with a longitudinal guide or way, a subframe slidable along the guide or way, a motor mounted on the subframe and carrying at the back and actuating a gear element, said gear element being disposed transversely of the machine, a transverse shaft mounted on the main frame in rear of the subframe, spaced gear elements journaled on the transverse shaft at opposite sides of the motor actuated gear element, and operating mechanism connected with the subframe and extending rearwardly therefrom for adjusting the subframe and the motor backwardly and forwardly, said operating mechanism being provided with means for disconnecting the subframe to permit the latter and the motor to slide forwardly and be removed from the main frame at the front thereof.

7. A machine of the class described including a main frame, a motor slidably mounted on the main frame and having a rearwardly projecting extended motor shaft, a support mounted on the main frame and provided with a bearing slidably receiving the rear end of the motor shaft, a gear element carried by the motor shaft and located at the back of the motor, spaced coacting gear elements located at opposite sides of the said gear elements, and means for moving the motor backwardly and forwardly to adjust the motor actuated gear element radially with respect to the spaced gears, said motor having sufficient forward adjustment to slide the motor shaft from the said bearing to permit access to the said motor actuated gear element.

8. A machine of the class described comprising a main frame, a transversely disposed transmission shaft mounted on the main frame, spaced gear elements fixed to and carried by the transmission shaft, power transmitting gearing connected with the transmission shaft, said gearing including a gear slidable on the transmission shaft to carry it into and out of mesh, a motor movably mounted upon the main frame and having a gear element arranged between and coacting with the said spaced gear elements and adjustable radially thereof through the movement of the motor to vary the speed of said gear elements, and means for sliding the transverse shaft to engage the spaced gear elements with and disengage them from the gear element of the motor.

9. A machine of the class described comprising a main frame, a transversely disposed transmission shaft mounted on the frame, power transmitting gearing connected with the transmission shaft one of the gears being slidable on the transmission shaft into and out of mesh, spaced gear elements fixed to the transmission shaft, a motor movable longitudinally of the frame and having a gear element adjustable radially of the said spaced gear elements through the movement of the motor to vary the speed, and means for moving the transmission shaft lengthwise to carry either of the spaced gear elements into engagement with the gear element of the motor.

10. A machine of the class described including a main frame, a transversely disposed transmission shaft mounted for sliding movement on the main frame, spaced gear elements fixed to the transmission shaft, a motor slidable longitudinally of the main frame and having a projecting shaft spaced from the transmission shaft, a gear element carried by the motor shaft and arranged between the said spaced gear elements, a support mounted on the main frame and located between the transmission shaft and the motor shaft and having a bearing slidably receiving the latter shaft, means for moving the motor bodily for adjusting the motor actuated gear element radily of the spaced gear elements to vary the speed, and operating mechanism for sliding the transmission shaft lengthwise to carry either of the spaced gear elements into engagement with the motor actuated gear element, said operating mechanism comprising a vertical pivot or spindle journaled on the said support and having angularly related arms, one of the arms being connected with the transmission shaft, and an operating lever connected with the other arm.

11. A machine of the class described comprising a main frame, a subframe slidable backwardly and forwardly on the main frame, a motor carried by the subframe and having a gear element, a transversely disposed transmission shaft mounted for slidable movement on the main frame, power transmitting gearing connected with the transmission shaft including a shiftable gear, spaced gear elements fixed to the transmission shaft and coacting with the gear element of the motor, operating levers located at the rear portion of the main frame, and means connected with the operating levers for moving the subframe for sliding the transmission shaft lengthwise and for shifting the said gear into and out of mesh.

In testimony, that I claim the foregoing as my own, I have hereto affixed my signature in the presence of two witnesses.

HENRY J. HEIDER.

Witnesses:
L. D. CHAMBERS,
L. C. KLEIN.

Copies of this patent may be obtained for five cents each, by addressing the "Commissioner of Patents, Washington, D. C."